United States Patent
Lefco et al.

(10) Patent No.: US 8,655,688 B1
(45) Date of Patent: *Feb. 18, 2014

(54) SYSTEM AND METHOD FOR MANAGING PAYMENTS FOR HEALTH CARE SERVICES

(75) Inventors: Bruce Lefco, Scottsdale, AZ (US); James Brindley, Glendale, WI (US)

(73) Assignee: Health Payment Systems, Inc., Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/465,972

(22) Filed: May 7, 2012

Related U.S. Application Data

(63) Continuation of application No. 12/815,040, filed on Jun. 14, 2010, now Pat. No. 8,175,901, which is a continuation of application No. 11/706,600, filed on Feb. 13, 2007, now Pat. No. 7,769,604.

(60) Provisional application No. 60/850,034, filed on Oct. 6, 2006.

(51) Int. Cl.
*G06Q 10/00* (2012.01)
*G06Q 50/00* (2012.01)
*G06Q 40/00* (2012.01)

(52) U.S. Cl.
USPC ........................................ 705/4; 705/2; 705/3

(58) Field of Classification Search
USPC .......................................................... 705/2–4
See application file for complete search history.

(56) References Cited

U.S. PATENT DOCUMENTS

| | | | |
|---|---|---|---|
| 5,235,507 A | 8/1993 | Sackler et al. | |
| 5,301,105 A | 4/1994 | Cummings | |
| 5,359,509 A | 10/1994 | Little et al. | |
| 6,112,183 A | 8/2000 | Swanson et al. | |
| 6,208,973 B1 * | 3/2001 | Boyer et al. | 705/2 |
| 6,601,761 B1 * | 8/2003 | Katis | 235/379 |
| 6,684,333 B1 | 1/2004 | Walker et al. | |
| 6,820,059 B2 * | 11/2004 | Wood et al. | 705/4 |
| 7,006,994 B1 | 2/2006 | Campbell et al. | |
| 7,769,604 B1 | 8/2010 | Lefco et al. | |
| 7,774,214 B1 | 8/2010 | Lefco et al. | |
| 7,783,504 B1 | 8/2010 | Lefco et al. | |
| 7,813,943 B1 | 10/2010 | Lefco et al. | |
| 2002/0198831 A1 * | 12/2002 | Patricelli et al. | 705/40 |

(Continued)

OTHER PUBLICATIONS

Frostin, Paul, "Medicare in the 21st Century", dated 2001, Benefits Quartertly, v.17 n. 4, Fourth Quarter, pp. 14-23.*

(Continued)

*Primary Examiner* — Jason Dunham
*Assistant Examiner* — Amber A Misiaszek
(74) *Attorney, Agent, or Firm* — Foley & Lardner LLP

(57) ABSTRACT

The health care payment techniques include a method. The method includes receiving, by a payment services manager computer system, from a plurality of computer systems of a plurality of health care providers via a communication network, notification of a plurality of claims for a plurality of health care services provided to a patient by the plurality of health care service providers. At least a portion of the claims are being payable by a participant in a benefits plan and at least a portion of the claims are being payable by a third party payor. The method further comprises remitting, by a payment services system logic implemented by the payment services manager computer system, for each claim in the plurality of claims, payment of the entire claim within a predetermined time period of receiving the notification of the claim.

20 Claims, 13 Drawing Sheets

(56) References Cited

U.S. PATENT DOCUMENTS

| | | | |
|---|---|---|---|
| 2003/0187695 A1* | 10/2003 | Drennan | 705/2 |
| 2004/0122766 A1 | 6/2004 | Brooks et al. | |
| 2004/0172313 A1* | 9/2004 | Stein et al. | 705/4 |
| 2005/0033609 A1 | 2/2005 | Yang | |
| 2005/0246289 A1 | 11/2005 | Alexander, IV et al. | |
| 2005/0288972 A1 | 12/2005 | Marvin et al. | |
| 2007/0260537 A1 | 11/2007 | Stone | |
| 2008/0045274 A1 | 2/2008 | Witkowski et al. | |

OTHER PUBLICATIONS

Ahlquist et al., The Next Trillion-Dollar Opportunity: Healthcare and Financial Services Convergence, eInsights Booz-Allen & Hamilton, Jun. 2001, 4 pages.

Babcock, Doctors Dependent on WebMD Despite Alleged Problems, Information Week, http://www.informationweek.com/story/showArticle.jhtml?articleID=17502021, Jan. 29, 2004, 3 pages.

Babcock, New Claim Game, Information Week, http://www.informationweek.com/story/showArticle.jhtml?articleID=17602359, Feb. 9, 2004, 3 pages.

Boulton, Billing Firm Signs Aurora, Milwaukee Journal Sentinel Online, http://www.jsonline.com/story/index.aspx?id=628590, Jul. 4, 2007, 3 pages.

Frostin, Medicare in the 21st Century, Benefits Quarterly, Fourth Quarter, 2001, 10 pages.

Health Plan Charge Cards: The Next Wave, Seyfarth Shaw Management Alert, May 2003, 2 pages.

HealthEZ, Flexible and Custom Plan Design, https://www.healthez.com/plan_design.html, retrieved on Aug. 19, 2011, 1 page.

HealthEZ, Health Plans, Dental Plans, Employee Benefits, HRA Administration, Wellness, https://www.healthez.com/what.html, retrieved on Aug. 19, 2011, 2 pages.

HealthEZ, Health, Dental, FSA, and HRA Benefit Administration, https://www.healthez.com/who.html, retrieved on Aug. 19, 2011, 1 page.

HealthEZ, Homepage, https://www.healthez.com/, retrieved on Aug. 19, 2011, 1 page.

HealthEZ, Login, https://www.healthez.com/provider.aspx, retrieved on Aug. 19, 2011, 2 pages.

HealthEZ, Simplified Medical Payment Service, https://www.healthez.com/payment_service.html, retrieved on Aug. 19, 2011, 1 page.

HealthEZ, The EZ Healthcare Payment Solution—Get Paid in Full, https://www.healthez.com/ezpay.html, retrieved on Aug. 19, 2011, 2 pages.

Jessee, Keep It Simple, Stupid, Medical Grouip Management Association, Mar. 2004, 11 pages.

Jessee, Simplifying the Healthcare Payment System, available at http://www.governor.ks.gov/ltgov/healthcare/items/SimplifyingTheHealthcarePaymentSystem.ppt, Medical Group Management Association, 8 pages.

Kaiser Family Foundation, UnitedHealth Group Program Will Deduct Medical Payments from Paychecks, http://www.kaisernetwork.org/daily_reports/rep_index.cfm?DR_ID=35968, Mar. 13, 2006, 1 page.

Medical News Today, UnitedHealth Group Program Will Deduct Medical Payments from Paychecks, http://www.medicalnewstoday.com/articles/39461.php, Mar. 15, 2006, 1 page.

Patient Friendly Billing, Data Coordination White Paper, Healthcare Financial Management Association, Jun. 20, 2003, 19 pages.

Rubenstein, In New Health Plan, Patients Pay Their Share—Or Else, The Wall Street Journal, Mar. 13, 2006, 5 pages.

Trizetto, MyHealthBank Finance, http://www.trizetto.com/hpsolutions/consumerMHBFinance.asp, The TriZetto Group, Inc., retrieved on May 15, 2009, 2 pages.

* cited by examiner

Please Detach & Send Coupon
With Credit Card Information or Check Payable to Health Payment System
April Invoice for Health Payment System from March 15, 2006-April 15, 2006
[Guarantor Name] & [Account Number]          Inquiries: 800.123.4567

| Summary of Activity: | To Avoid Paying Late & Service Fees on Your Purchase Balance, Pay the "Total Amount Due" of $1,350.00 by April 28, 2006 |
|---|---|
| Previous Balance .............. $1,000 | |
| Payments & Credits ........... 150 | |
| New Patient Responsibility ...... 500 | |
| Service & Late Fees* ......... 0 | |
| Total Amount Due $ 1,350 | PAYMENT DUE DATE: April 28, 2006 |

IF YOU WILL HAVE TROUBLE PAYING THE TOTAL BILL
PLEASE CALL 800.123.4567 TO DISCUSS PAYMENT OPTIONS

| Payments & Credits | Service Date | EOB Reference Number | Service Provider | Amount Owed | Memo |
|---|---|---|---|---|---|
| | | | | | |
| | | | | | |
| | | | | | |
| Healthcare Purchases | | 1 | | | |
| | | 2 | | | |
| | | 3 | | | |
| | | | | | |
| | | | | | |
| | | | | | |
| | | | | | |
| | Continued on Next Page | | | | |

[Memo Area]

Explanation of Benefits (EOB)

| Insured's Name & Address | Group Information |
|---|---|
| John Doe<br>6679 Brown Deer Road.<br>Milwaukee, WI 53217 | Group ID:<br>Group Name:<br>Plan:<br>Product Line: |

Invoice Reference Number 1

| Patient Information | Name: |
|---|---|
| Member ID:<br>Birth Date:<br>Claim Number: | Document ID:<br>Patient Account:<br>Relationship to Insured: |

| Claim Summary Information – Provider: [Provider Name] | | | | | | | |
|---|---|---|---|---|---|---|---|
| Charge | - Excluded Amount | - Provider Discount | = Allowed Amount | -Deductible | - Co- Pay | - Co-Ins. | = Benefit Amount |
| $ 120.87 | $ | $ | $ | $ | $ | $ | $ |
| 1st Ins. Paid → $ | | 2nd Ins. Paid → $ | | Member Owes → | | $ | |
| Claim Detail Information | | | | | | | |

| Date of Service | | Service Code | Charge | Excluded Amount | Remark Codes | Provider Discount | Allowed Amount | Deductible | Co-Pay | Co-Ins | Benefit Amount | Member Owes | Ordering Physician |
|---|---|---|---|---|---|---|---|---|---|---|---|---|---|
| From | To | | | | | | | | | | | | |
| | | | | | | | | | | | | | |
| | | | | | | | | | | | | | |
| | | | | | | | | | | | | | |

Invoice Reference Number 2

| Patient Information | Name: |
|---|---|
| Member ID:<br>Birth Date:<br>Claim Number: | Document ID:<br>Patient Account:<br>Relationship to Insured: |

| Claim Summary Information – Provider: [Provider Name] | | | | | | | |
|---|---|---|---|---|---|---|---|
| Charge | - Excluded Amount | - Provider Discount | = Allowed Amount | -Deductible | - Co- Pay | - Co-Ins. | = Benefit Amount |
| $ 120.87 | $ | $ | $ | $ | $ | $ | $ |
| 1st Ins. Paid → $ | | 2nd Ins. Paid → $ | | Member Owes → | | $ | |
| Claim Detail Information | | | | | | | |

800

| Service Codes/Descriptions/Remark Codes Descriptions /Benefit Information/Other Information | | | | | | | | | | | | | | | | | |
|---|---|---|---|---|---|---|---|---|---|---|---|---|---|---|---|---|---|
| Code/Description | Remarks | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |

FIG. 13

SYSTEM AND METHOD FOR MANAGING PAYMENTS FOR HEALTH CARE SERVICES

CROSS-REFERENCE TO RELATED APPLICATIONS

This application is a continuation of U.S. patent application Ser. No. 12/815,040, filed Jun. 14, 2010, entitled "System and Method for Managing Payments for Health Care Services" which is a continuation of U.S. patent application Ser. No. 11/706,600, filed Feb. 13, 2007, entitled "System and Method for Managing Payments for Health Care Services" which claims the benefit of U.S. Provisional Application No. 60/850,034, filed on Oct. 6, 2006, entitled, "System and Method for Managing Payments for Health Care Services." application Ser. Nos. 12/815,040; 11/706,600 and 60/850,034 are hereby expressly incorporated by reference in their entireties.

BACKGROUND

The present invention relates generally to systems and methods for managing payments for health care services.

Modern health care systems often involve relationships between a number of parties including patients, health care providers, employers, insurers and other providers of health care benefit plans, and the administrators of such plans. For example, health care providers may contract with multiple health care network provider organizations such as preferred provider organizations (PPOs), health management organizations (HMOs), managed care organizations, insurers, or point-of-service plan providers. The network provider organization provides patients (or participants) with a list of the health care providers participating in the network and which accept fees in accordance with a fee schedule negotiated with the network provider organization. While participants are free to choose among the universe of providers, financial and other incentives are built into the applicable health care benefit plan for the participants to select participating providers. Access to the network provider organization may be supplied through their employer and/or other affiliation with an employer organization. For example, the participant may be a retiree or may be a dependent child of an employee. Membership may also be obtained through other types of relationships, such as through a professional organization.

The relationship between the network provider organization, the provider, the participant and the employer is defined by various agreements. For example, based on the agreements it is determined at what price the health care provider will discount the cost of health care services for patients having access to the network provider organization. After a health care service is provided, the health care provider will issue a bill for health care services rendered to the party responsible for administration of the benefit plan such as a third party administrator. The third party administrator or the network provider organization then reprices the claim to reflect the agreed upon fee schedule. Following repricing, the third party administrator adjudicates the bill in accordance with the terms of the applicable health care benefit plan. Adjudication includes a determination of the allocation of responsibility for payment of the bill as between the employer organization and the health care benefit plan participant. The third party administrator collects payment from the employer organization for the employer portion of the claim. Where the charge for health care service is only partially payable by the employer, the participant is responsible for payment of the remaining charge. The participant portion of the claim is typically billed directly to the participant by the health care provider.

The participant's personal obligation to the health care provider for health care services rendered is based upon a number of factors including the health care benefit plan terms regarding annual deductibles, required co-payments for services received, or required co-insurance payments. Therefore for example, where a participant has received medical services worth $800 on the basis of the negotiated fee schedule, and the participant has a $300 deductible, the network provider organization may pay the health care provider $500 and the health care provider may obtain the remaining balance of $300 from the participant in satisfaction of the participant's deductible.

In contemporary health care billing programs, there are imbedded costs associated with collecting the participant's portion of the health care claim such as the cost of generating periodic statements, the issuance of reminder notices on past due accounts and the cost of writing off uncollectible accounts receivable. These costs may be related to: (i) the retention of internal billing staff or the payment of fees to independent billing and collection services; and (ii) the time value of money lost on delayed payments. Some of these costs are specifically attributable to a lack of clarity in the current billing system resulting from bills received from providers or provider organizations unknown to the patient such as from medical laboratories, diagnosticians or ancillary health care service providers other than the patient's primary physician. The receipt of bills from unknown entities, the receipt of multiple billing invoices from multiple providers, and certain providers' delay in requesting payment for services each contribute to the lack of clarity in the health care system.

As a part of the claims adjudication process, a considerable number of mailings are sent to the participant (e.g., statements of billed charges, multiple explanations of benefits, notices, and other information concerning services provided and the amounts to be paid to the providers). In many cases, there is often a significant delay between the time when the service is first provided and the time when the final bill for the service is sent to the participant, at which point the participant may have difficulty remembering what service was performed. Additionally, some of the services may have been provided by providers with whom the participant did not directly interact (e.g., laboratories that performed lab work for the participant at the request of a doctor). In such instances, the participant may receive a bill from an unknown provider for services that were performed some time ago. Moreover, many jurisdictions have local and/or federal regulations regarding the information that must be disclosed to health care participants in the medical bill. Typically, the bill is significantly lengthened as a result of these mandatory disclosures. Such bills can be very confusing and annoying for the participant, particularly if there are also billing errors as sometimes occur.

With contemporary billing arrangements, the providers typically bear the risks and costs associated with non-payment and/or late payment of the participant portion of the claim. In the best case scenario, the participant recognizes his or her obligation to pay and pays promptly. Even then, however, there is still significant delay between the time the service is originally provided and the time when the provider finally receives payment from the participant for the participant portion of the claim. If, on the other hand, the participant disputes the bill, or is unable to pay promptly, then the provider faces further delays in getting paid for its services and/or faces non-payment altogether. It has been estimated that 30-50% of the participant portion of medical claims is never recovered by the health care provider due to the above-mentioned inefficiencies and risks in modern billing systems.

It would be desirable to provide improved systems and methods for managing payments for health care services that would provide a less costly and more readily understandable mechanism for receiving payment of the participant portion of the claim. It will be appreciated that while certain features and advantages are described herein, the claims are not limited to systems and methods which achieve any one or more of these features, but rather may also encompass systems and methods having other features and advantages different than those described herein.

SUMMARY

In an exemplary embodiment, a computer-implemented method comprises receiving, by a payment services manager computer system comprising a processor and machine readable media having instructions stored therein that are executed by the processor, from a plurality of computer systems of a plurality of health care providers via a communication network, notification of a plurality of claims for a plurality of health care services provided to a patient by the plurality of health care service providers. At least a portion of the claims are being payable by a participant in a benefits plan and at least a portion of the claims are being payable by a third party payor. The method further comprises remitting, by a payment services system logic implemented by the payment services manager computer system, for each claim in the plurality of claims, payment of the entire claim within a predetermined time period of receiving the notification of the claim, including (i) remitting payment of the portion of the claim payable by the third party payor, and (ii) remitting payment of the portion of the claim payable by the participant. The method further comprises combining, by the payment services system logic, claim information from the plurality of health care service providers into a master bill. The master bill contains claim information for the plurality of health care service providers. The method further comprises itemizing, on the master bill, by the payment services system logic, claim information for each of the health care services provided to the patient by the plurality of health care service providers, and wherein the patient did not directly interact with at least some of the health care service providers. The method further comprises providing the participant the master bill, including the claim information for the plurality of health care service providers. The method further comprises tracking, by the payment services system logic, payment of the master bill by the participant.

In another exemplary embodiment, a computer-implemented method comprises receiving, by a payment services manager computer system comprising a processor and machine readable media having instructions stored therein that are executed by the processor, from a plurality of computer systems of a plurality of health care providers via a communication network, notification of a plurality of claims for a plurality of health care services provided by the plurality of health care service providers to a patient, at least a portion of the claims being payable by a participant enrolled in a benefits plan. The method further comprises maintaining, by a payment services system logic implemented by the payment services manager computer system, funds to pay the portion of the claims payable by the participant. The method further comprises remitting, for each claim in the plurality of claims, payment of the claim, including (i) remitting, on behalf of the participant, payment of the portion of the claim payable by the participant, and (ii) accepting risk of delinquency and/or non-payment by the participant on the funds used to pay the portion of the claims payable by the participant. The method further comprises-combining, by the payment services system logic, claim information from the plurality of health care service providers into a master bill, the master bill containing claim information for the plurality of health care service providers. The method further comprises itemizing, on the master bill, by the payment services system logic, claim information for each of the health care services provided to the patient by the plurality of health care service providers. The patient did not directly interact with at least some of the health care service providers. The method further comprises sending the participant the master bill, including the claim information for the plurality of health care service providers. The method further comprises tracking, by the payment services system logic, payment of the master bill by the participant.

In another exemplary embodiment, a method comprising receiving, by a payment services manager computer system comprising a processor and machine readable media having instructions stored therein that are executed by the processor, from a plurality of computer systems of a plurality of health care providers via a communication network, a plurality of claims for a plurality of health care services provided by the plurality of health care service providers to a patient, the receiving being performed by program logic implemented by the instructions stored in the machine-readable storage media, at least a portion of the claims being payable by a participant in a benefits plan and at least a portion of the claims being payable by a third party payor. The method further comprises remitting payment, by a payment services system logic implemented by the payment services manager computer system, for each claim in the plurality of claims, payment of the entire claim in a single payment, including (i) remitting payment of the portion of the claim payable by the third party payor, and (ii) remitting payment of the portion of the claim payable by the participant. The method further comprises combining, by the payment services system logic, claim information from the plurality of health care service providers into a master bill, the master bill containing claim information for the plurality of health care service providers. The method further comprises itemizing, on the master bill, by the payment services system logic, claim information for each of the health care services provided to the patient by the plurality of health care service providers, and wherein the patient did not directly interact with at least some of the health care service providers. The method further comprises sending the participant the master bill, including the claim information for the plurality of health care service providers. The method further comprises tracking, by the payment services system logic, payment of the master bill by the participant.

BRIEF DESCRIPTION OF THE DRAWINGS

FIG. 11 is an illustration of a master bill, according to an exemplary embodiment.

FIG. 12 is an illustration of a master bill, according to an exemplary embodiment.

FIG. 13 is an illustration of a master bill, according to an exemplary embodiment.

DETAILED DESCRIPTION

Figure 1:
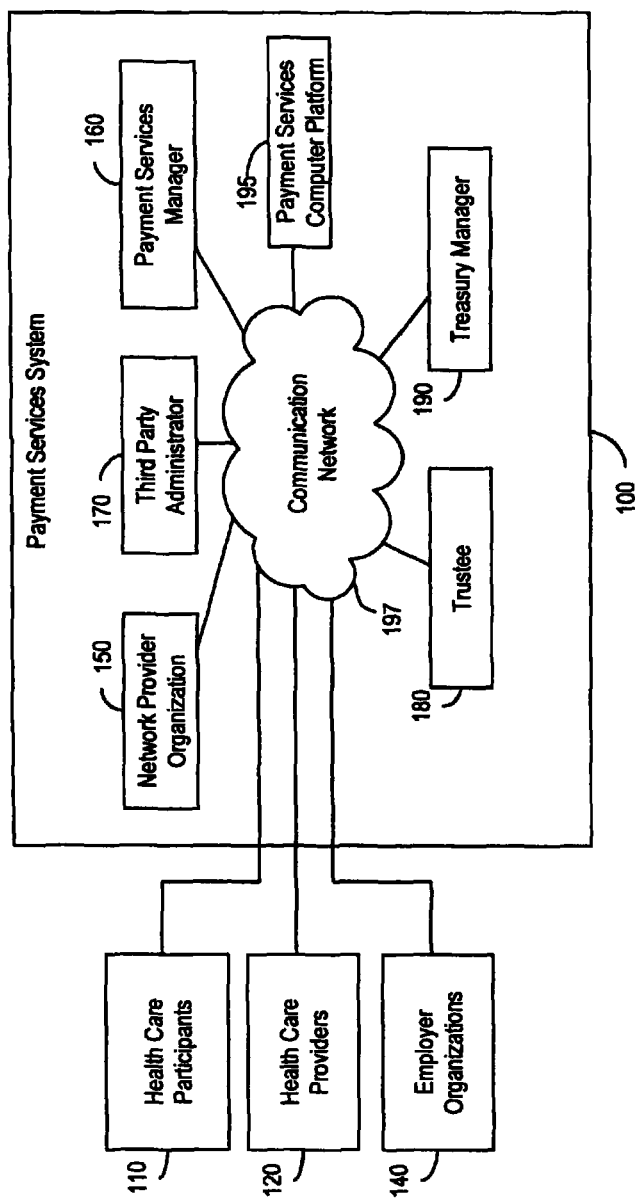
FIG. 1 is a block diagram illustrating a payment services system and the relationship between the health care provider, health care participant and network provider organization with respect to the payment services system, according to an exemplary embodiment.

Referring generally to FIGS. 1-9 and specifically to FIG. 1, FIG. 1 is a block diagram of an exemplary payment services system 100 provided for assisting in the payment of health care services. The payment services system 100 interfaces with a health care participant 110 (e.g., a patient) and health care providers 120 (e.g., hospitals, laboratories, physicians, psychologists, certified specialists, general practitioners, other health care professionals, and so on) to promptly issue payment to the health care providers 120 for health care services rendered to the health care participant 110. The payment services system 100 includes a payment services manager 160, a third party administrator 170, a trustee 180, and a treasury manager 190. The trustee 180 and the treasury manager 190 may, for example, be implemented by a financial institution 195 (e.g., an FDIC insured bank, insurance company, and so on). As will be appreciated, system 100 may include fewer or additional entities. For example, a network provider organization 150 may be included. Also, as will be appreciated, although various operations are described as being performed by different respective entities, the various operations may be performed by any combination of entities which each perform one or more of the operations described herein, and some operations may not be necessary and/or may be replaced with other operations in some embodiments. Also, although not shown as such, the operations performed by payment services system 100 may also be performed by one or more of the health care providers 120 and/or by one or more of the employer organizations 140. Additionally, although in the exemplary embodiment, the payment services system 100 is described in the context of self-funded health plans sponsored by employers, it will be appreciated that the payment services system 100 may be used in connection with other types of plans, including insured health benefit plans. In an exemplary embodiment, the payment services system 100 is implemented in a computer system 900 that comprises the individual computers systems of the entities 110-190 connected through a communication network 197, such as the Internet, as described in greater detail below in connection with FIG. 9.

Figure 2:
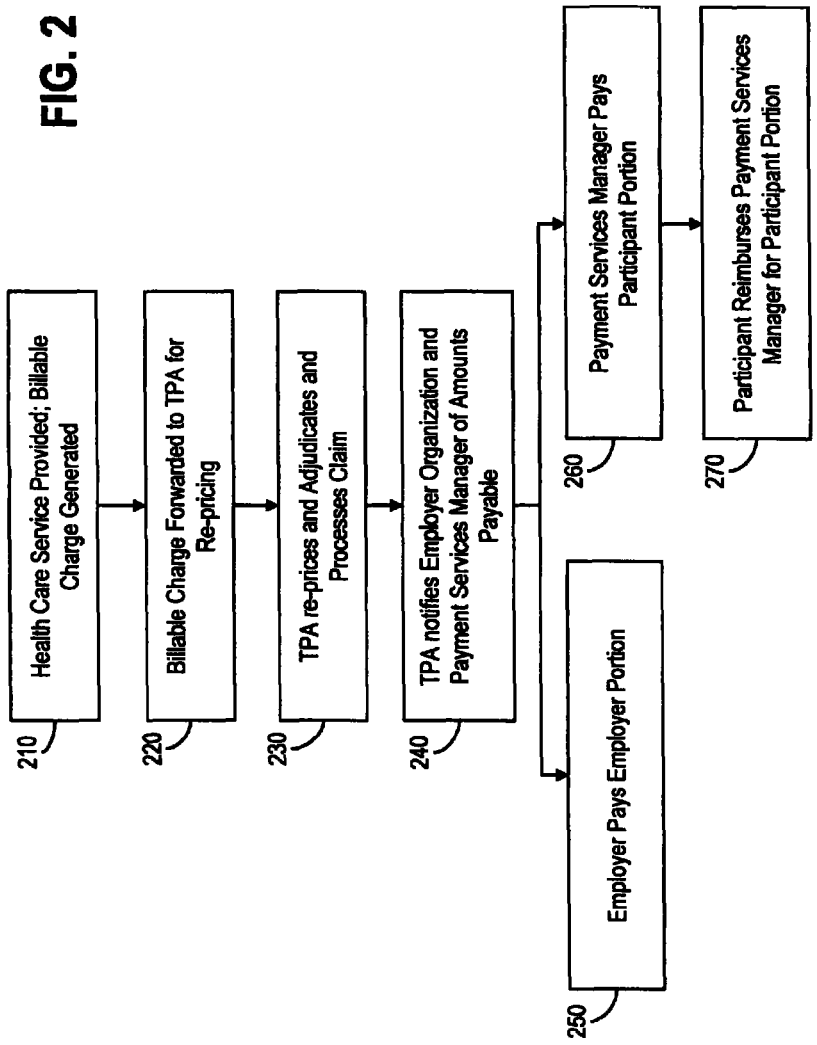
FIG. 2 is a flow chart illustrating a method for managing health care billable charges, according to any exemplary embodiment.
Figure 3:
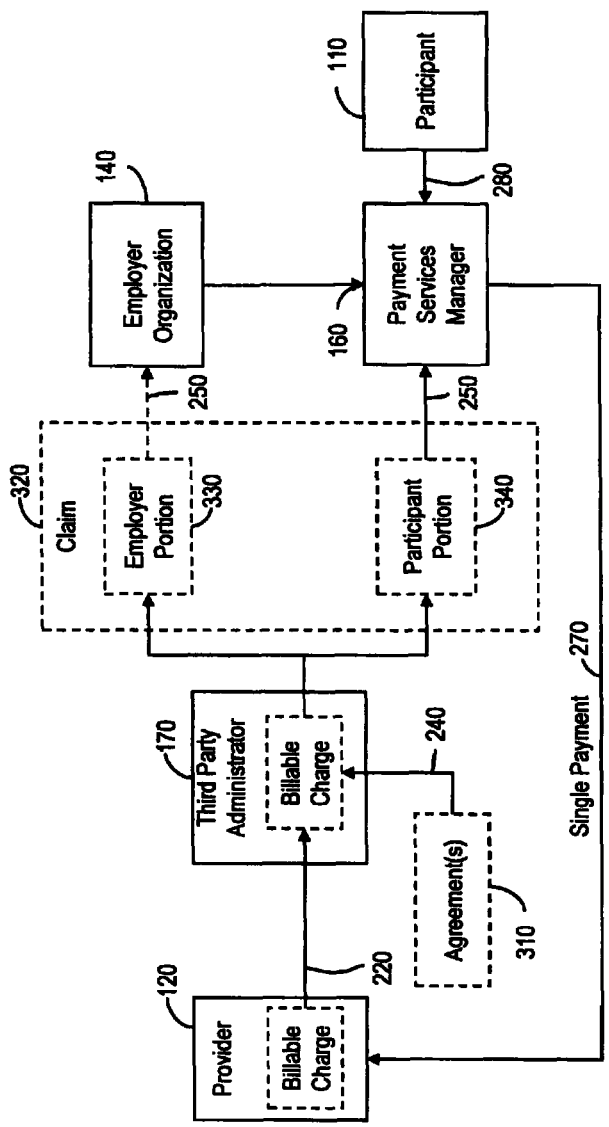
FIG. 3 is a block diagram illustrating the conversion of the billable charge issued by the health care provider into a claim and subsequent payment of the claim, according to an exemplary embodiment.

Referring now to FIGS. 2-3, FIGS. 2-3 show an example of overall operation of the system of FIG. 1 according to an embodiment. FIG. 2 is a flowchart of a method for managing health care charges for services received by a participant, according to one exemplary embodiment. FIG. 3 is a block diagram showing how a billable charge may be processed to result in payment to a health care provider 120. It may be noted that, in FIG. 3, the reference numbers 220-280 correspond to steps 220-280 shown in FIG. 2.

In one illustrated exemplary embodiment, a health care provider 120 provides a health care service to a participant and generates a billable charge at step 210. The health care service may be provided to the participant 110 directly (i.e., the participant 110 is the patient) or vicariously (e.g., the patient is a covered family member of the participant). At step 220, the billable charge is transmitted to the third party administrator 170. At step 230, the third party administrator 170 may re-price and adjudicate the billable charge, e.g., by discounting the billable charge under a prior agreement with the health care provider 120.

The repricing is undertaken according to the terms of an agreement between the health care provider and payment services manager or third party administrator 170 or other party. The claim is adjudicated according to the terms of one or more agreements 310, such as a health care benefit plan agreement, prompt payment system provider agreement, and/or other agreement. For example, the claim may be adjudicated according to a health care benefit plan which is a contract, policy, or other document defining the features of a group health care plan or benefit program, under which a payor (e.g., the participant 110 or the employer organization 140) is obligated to pay for health care services. For example, during the adjudication process, the third party administrator 170 may determine whether the service will be covered in its entirety by the employer, in which case the network provider organization 150 will submit any payment to the health care provider 120. The third party administrator 170 may also determine during the adjudication process whether a deductible is to be paid (i.e., the amount a participant 110 is required to pay before a claim 320 for benefits by the participant is eligible for reimbursement by the payor). The third party administrator may also determine the apportionment of the billable charge into an employer portion 330 (which the employer organization 140 has responsibility for paying under the self-funded health plan) and the participant portion 340 (which the participant 110 has responsibility for paying under the self-funded health plan) as a result of the inclusion of deductible co-payment or co-insurance provisions of the health care benefit plan.

At step 240, financial institution 195 and the employer organization 140 are notified of the total amount of the claim payable to the provider 120. At step 250, the employer organization 140 pays the employer portion 330 of the claim to the financial institution 195. At step 260, the payment services manager 160 pays the participant portion 340 of the claim. The employer portion 330 of the claim and the participant portion 340 of the claim may be paid differently in different embodiments. In an exemplary embodiment, described in greater detail below in connection with FIGS. 4-7, the employer organization 140 maintains an employer deposit account 410 and an employer reserve account 420 with the financial institution 195 that serves as the trustee 180 and the treasury manager 190. The employer organization 140 may wire funds from the deposit account 410 within 48 hours of receiving notification of the claim 320. In such an embodiment, the third party administrator 170 may notify the payment services manager 160 of the respective amounts of the employer portion 330 and the participant portion 340 of the claim, and coordinate payment of the portions 330 and 340 using funds deposited in the accounts 410 and 420 and/or using funds deposited in other accounts, as described below. In other exemplary embodiments, payment occurs in a different manner.

At step 270, the participant 110 then pays the participant portion 340 of the claim to the payment services manager 160. As may be noted, therefore, the provider 120 receives the participant portion 340 of the claim prior to the participant 110 paying this amount. As a result, the provider 120 receives payment earlier than if it received payment after the participant 110 paid this amount. In an exemplary embodiment, the provider receives payment in 30 days or less, 20 days or less, 10 days or less, or in another period of time. Also, in an exemplary embodiment, the provider 120 may be paid regardless whether the participant 110 pays the participant portion 340 of the claim. Thus, risk of non-payment of the participant portion of the claim may be shifted to another one of the entities such as to the payment services manager 160, as described below.

Figure 4:
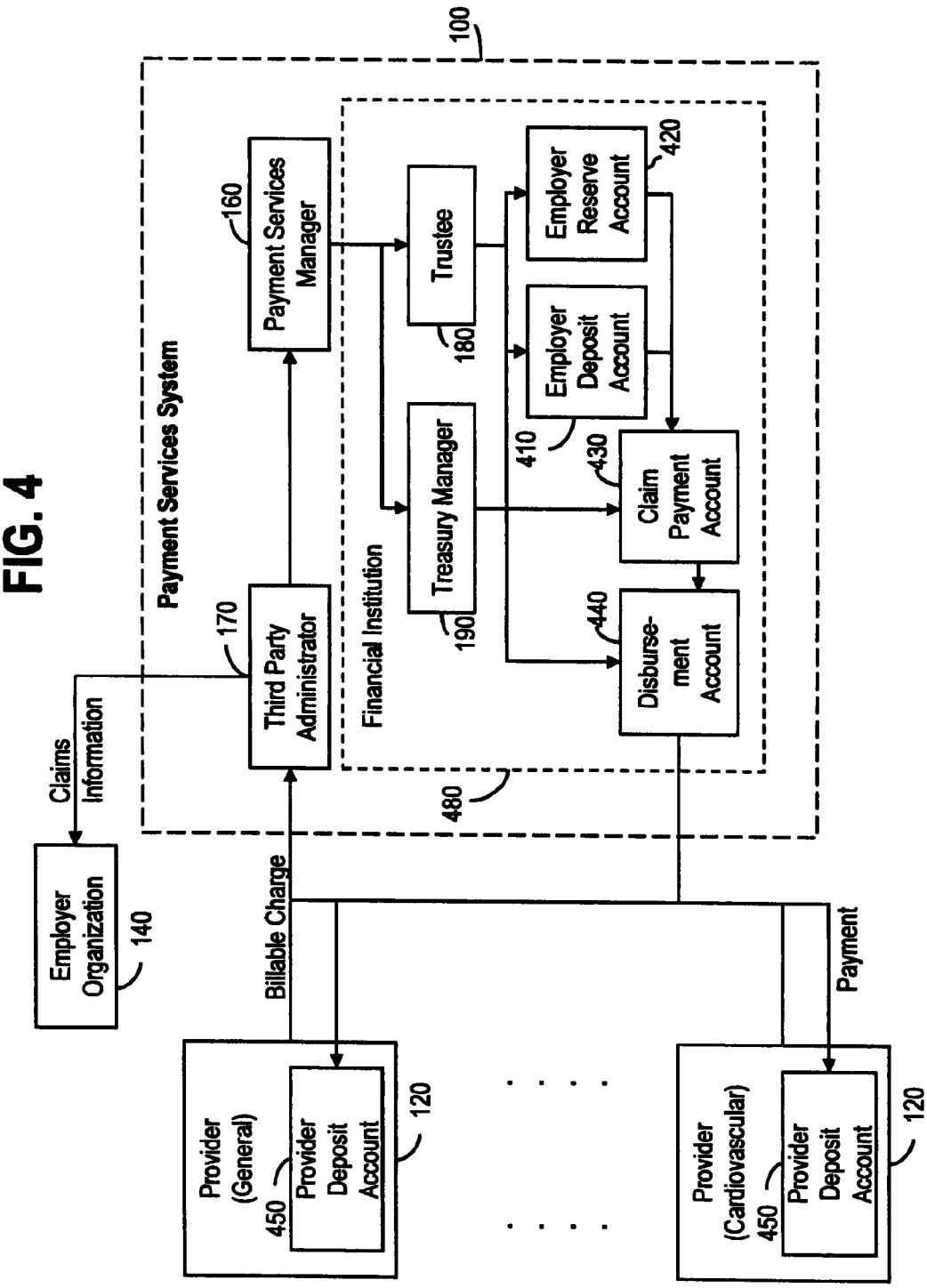
FIG. 4 is a block diagram illustrating a payment services system and a plurality of health care providers, according to an exemplary embodiment.

Referring now to FIGS. 4-7, FIGS. 4-7 show aspects of the payment/funding mechanism (e.g., including the movement of money between various accounts) used in the payment services system 100 in greater detail, according to an exemplary embodiment. Specifically, FIG. 4 is similar to FIG. 1, but shows aspects of the funding mechanism between the health care providers 120 and the payment services system 100 in greater detail.

As shown in FIG. 4, a billed charge is delivered by the provider 120 to the third party administrator 170 and is processed by the third party administrator 170 and the payment services manager 160, as described above. The third party administrator 170 provides notification of the billed charge to the employer organization 140. The payment services manager 160 coordinates payment of the claim through the financial institution 195, which serves as the trustee 180 and the treasury manager 190. To this end, a plurality of accounts are used including an employer deposit account 410, an employer reserve account 420, a claim payment account 430, a disbursement account 440, and provider deposit accounts 450.

The employer deposit account 410, which may comprise separate respective sub-accounts for each employer, is used to receive and hold funds from employers for the payment of the employee portion 330 of claims from the health care providers 120. For example, at periodic intervals (e.g., once per week, on a Monday), the third party administrator 170 may notify each employer of the amount of claims to be funded for the upcoming week and may notify the trustee 180 of all expected wire transfers by employer and relevant amounts. Each employer organization 140 may then transfer funds into its respective claim payment account 430, and the trustee 180 may notify the payment services manager 160 of the funds transfers received by employer organization and amount. The funds may be directly transferred into the claim payment account 430. Subsequently, these funds may be transferred to the disbursement account 440 for payment of the employer portion of the health care claims.

The employer reserve account 420, which may also comprise separate respective sub-accounts for each employer, is used to receive and hold a reserve of funds for the payment of the participant portion 340 of claims from the health care providers 120. In an exemplary embodiment, the employer deposit account 420 holds a reserve amount of funds (e.g., two weeks worth of payments) which is used on an interim basis to pay the participant portion 340 of claims from the health care providers 120. Again, these funds may be transferred to the disbursement account 440 for payment of the employer portion of the health care claims. Both the employer portion and the employee portion of the claim are remitted to the provider in a single combined payment through the payment services manager 160. The funds that are disbursed for this purpose are subsequently replenished with funds received from the participant 110 when the participant pays the participant portion 340 of the claim (FIG. 2, step 280). Therefore, the provider 120 may receive both the employer portion 330 and participant portion 340 of the claim 320 in a single payment. Additionally, the payment is received more promptly than if the provider 120 was paid when the participant portion 340 of the claim 320 was paid by the participant 110.

The claim payment account 430 is an intermediate account between the employer accounts 410, 420 and the disbursement account 440. In an exemplary embodiment, claim payment account 430 is used to receive and hold funds after adjudication of related claims and prior to the transfer of such funds to the provider disbursement account 440 to pay such claims. In an exemplary embodiment, the claim payment account 430 (and/or various sub-accounts) are owned by the consortium of various employer organizations 140 and managed by trustee 180. After a claim has been adjudicated and the employer organization 140 has paid its portion of the claim to the financial institution 195, amounts are then transferred from the claim payment account 430 to the disbursement account 440, where they are held until final disbursement to the provider 120.

The disbursement account 440 is an intermediate account between the claim reserve account 430 and the provider accounts 450. The trustee 180 moves amounts to the disbursement account 440 to fund the employer portion 330 and participant portion 340 of the claim. For example, each week the payment services manager 160 may provide the trustee 180 with the total amount for the claims to be paid within a predetermined period of time (e.g., within two business days). The information may be provided on an employer-by-employer basis. This information may then be used by the trustee to move the funds from the claims reserve account to the provider disbursement account 440.

The provider deposit account 450, or health care provider's account, receives payments from the payment services system 100. For example, the payment services manager 160 may provide the treasury manager 190 with a NACHA-formatted file containing transfer requirements for claims to be funded. This information may then be used by the treasury manager 190 to transfer funds from the disbursement account 440 to the provider deposit account 450. This information may also be used to transfer a portion of the claim payment funds to a payment services manager reserve account 610 and a payment services manager operating account 620, as described in greater detail below in connection with FIG. 6. In an exemplary embodiment, the provider deposit account 450 is established at the same financial institution that provides trustee services (trustee 180) and treasury management services (treasury manager 190). In another embodiment, the provider deposit account 450 is established at another financial institution. In another exemplary embodiment, an insurance company provides trustee services, treasury management services and/or payment services manager services.

Figure 5:
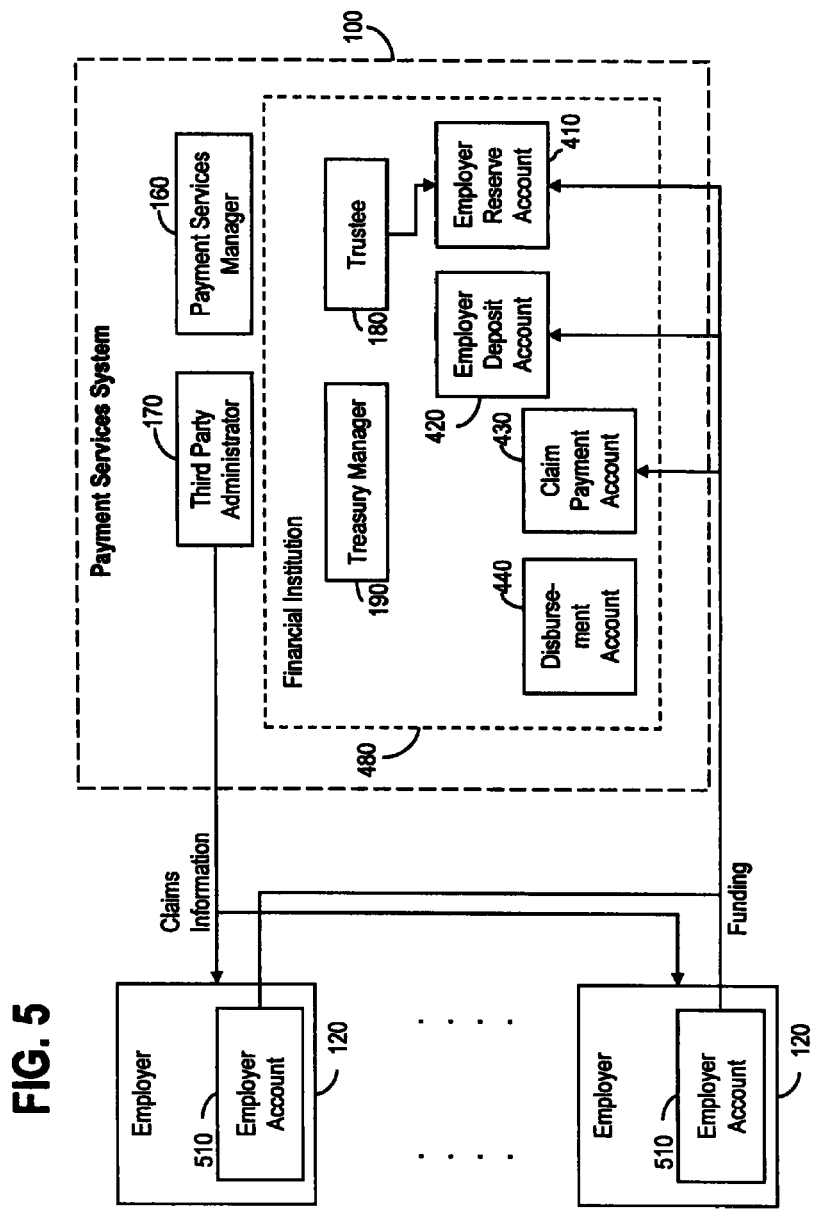
FIG. 5 is a block diagram illustrating a payment services system and a plurality of employer organizations, according to an exemplary embodiment.

Referring now to FIG. 5, FIG. 5 is similar to FIG. 1 but shows aspects of the fund transfer mechanism between the payment services system 100 and the employer organization 140 in greater detail. As shown in FIG. 5, in an exemplary embodiment, an employer organization 140 establishes at least one account 510 for providing funding to the employer deposit account 410 and the employer deposit account 420, as described above. The employer also receives claims information from the payment services manager 160, as shown.

Figure 6:
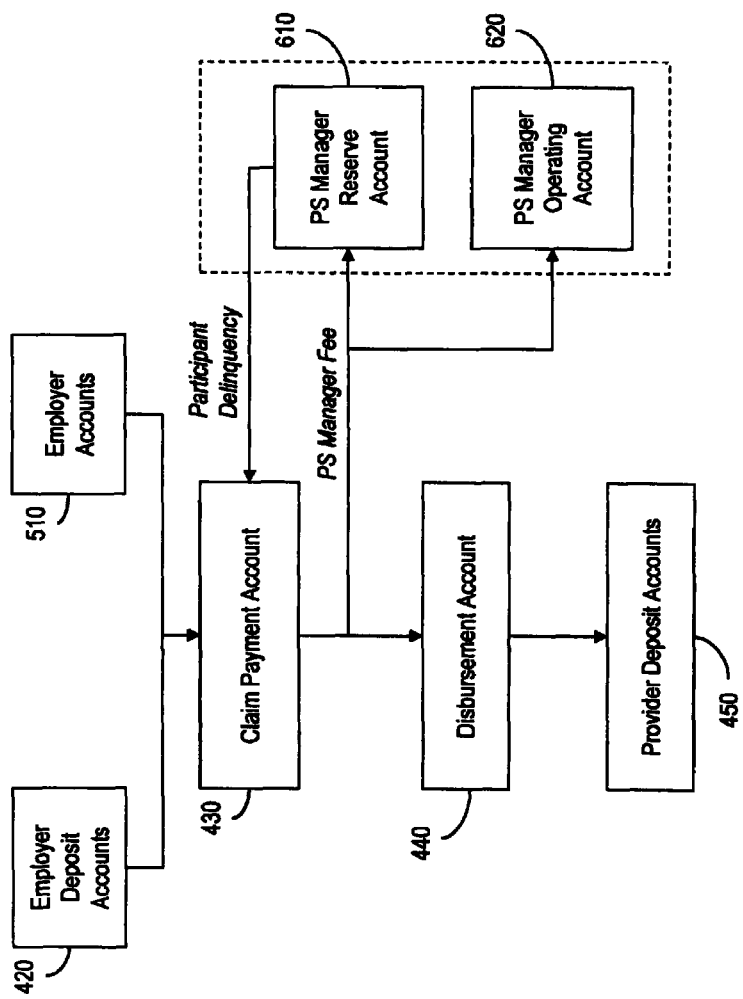
FIG. 6 is a block diagram illustrating distribution to the payment services manager operating and reserve account, according to an exemplary embodiment.

Referring now to FIG. 6, FIG. 6 shows the accounts 410-450 shown in FIGS. 4-5 as well as additional accounts 610 and 620. In an exemplary embodiment, the payment services manager 160 charges at least one payment services management fee in connection with each claim satisfied through the payment services system 100. The fee may, for example, be calculated as a percentage of each transaction or payment made to a health care services provider 120. Thus, as shown in FIG. 6, the trustee transfers a portion of the funds from claim payment account 430 to the payment services manager reserve account 610 and the payment services manager operating account 620 instead of to the disbursement account 440. In this way, the claim payment account 430 acts as a holding account. The payment services management fee compensates the payment services manager 160 for bearing the risk of loss undertaken by the payment services manager 160 with respect to the collection of delinquent payments from participants 110 of the participant portions 340 of the claims. The payment services management fee also compensates the payment services manager 160 for operating the payment services system 100. In the illustrated embodiment, the fee is paid by the providers 120, in as much as it is taken off the top as a percentage of the funds otherwise directed to the providers 120. In exchange, as indicated previously, the providers receive the benefits of quicker payment and avoiding the risk of non-payment by the participant.

The payment services manager reserve account 610 is a reserve fund maintained by the payment services manager 160 in the event of delinquency of a participant in paying the participant portion 340 of a claim. As indicated previously, the participant portion 340 of claims is initially paid using funds from the employer deposit account 420 for the respective employer 140 of that participant 110. Assuming the participant 110 pays in a timely manner, the funds received from the participant 110 are deposited back into the employer deposit account 420 to replenish the funds that were earlier disbursed. However, if the participant 110 is delinquent in paying for more than a predetermined period of time (e.g., the participant is more than 60 days delinquent), then the funds used to replenish the employer deposit account 420 are obtained from the payment services manager reserve account 610. Thus, as previously indicated, the payment services manager 160 bears the risk of delinquent payment by the participant 110. The funds that flow into the payment services manager reserve account 610 are used to fund the liabilities incurred by the payment services manager 160 in connection with this risk. To the extent that an accumulated excess builds up in the payment services manager reserve account 610, these funds compensate the payment services manager 160 for accepting the risk of delinquency. In another embodiment, rather than having an accumulated excess build up, the payment services manager 160 may manage the amount of funds flowing into the payment services manager reserve account 610 to approximately meet the incurred liabilities, and then take as compensation unused funds from the payment services manager operating account 620.

The payment services manager operating account 620 holds and disburses operating funds for business purposes of the payment services manager 160. The payment services manager 160 may derive compensation from funds that are deposited in the payment services manager operating account 620 that are in excess of the funds needed to operate the payment services system 100.

As will be appreciated, other entities involved in the payment services system 100 may receive compensation in other ways. For example, one or more of the accounts 410-450 may be non-interest bearing accounts, thereby permitting the financial institution 195 to receive compensation in the form of access to interest-free funds maintained on deposit. As another example, the financial institution 195 (e.g., the trustee 180 and/or the treasury manager 190) may charge fees on a per transaction basis. The fee may be charged to the payment services manager 160, may be charged to the providers 120, or may be charged to another entity. Other financial benefits may be exchanged between the entities 110-190. For example, in an exemplary embodiment, each provider 120 may agree to provide a discount to participants 110 affiliated with the network provider organization 150. The discount may, for example, be greater than the discount(s) provided to any other network provider organization 150 (e.g., except than programs maintained by the state or federal government, such as Medicare and Medicaid).

Figure 7:
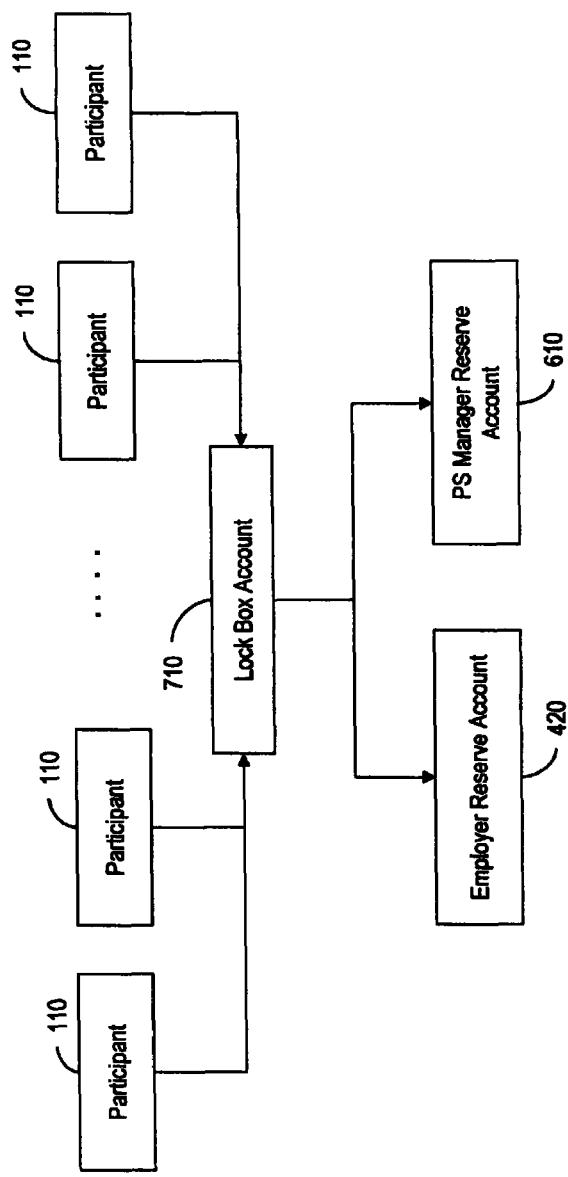
FIG. 7 is a block diagram illustrating a lock box account, according to an exemplary embodiment.

Referring now to FIG. 7, in an exemplary embodiment, a lock box account 710 is used to receive payments received from participants 110. As shown in FIG. 7, the lock box account 710 may be used for the receipt of payments from participants 110 and the transfer of such payments into the appropriate employer deposit account 420 or the payment services manager reserve account 610. Participants may mail payments to the financial institution 195 for disbursement into the lock box account 710. The financial institution 195 processes the remittance and deposits the funds into the lock box account 710. If a participant 110 was previously delinquent on a payment, and the payment services manager 160 had transferred funds from the payment services manager reserve account 610 to the employer reserve account 420, then the funds may be transferred to the payment services manager reserve account 610. Otherwise, the funds are deposited into the employer reserve account 420, as previously described.

Figure 8:
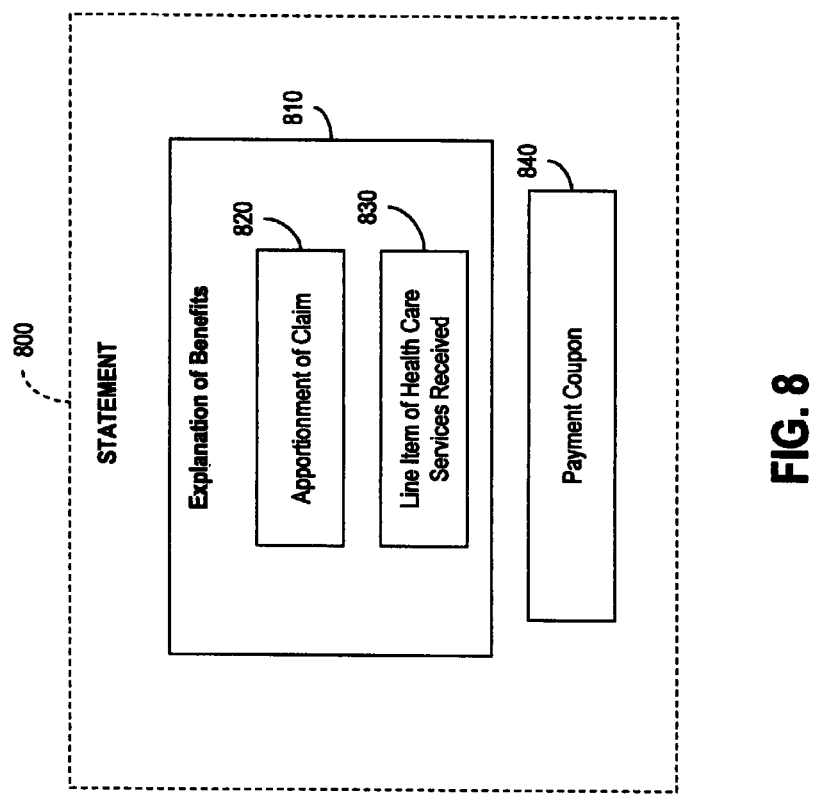
FIG. 8 is a block diagram illustrating the statement with itemized explanation of benefits, according to an exemplary embodiment.

Referring now to FIG. 8, in an exemplary embodiment, the payment services manager 160 sends a master statement or master bill 800 or statement for collection to the health care participants 110. In an exemplary embodiment, the master bill 800 may be generated by the computer platform 965 and mailed out to the participant on a periodic basis (e.g., on a monthly basis). The master bill 800 may comprise a statement of all outstanding claims owed by the participant 110. The statement 800 may include an itemized explanation of benefits 810 including a line item listing 820 of health care service provided by various providers 120 during the prior period (e.g., during the prior month) and an identification 830 of the apportionment of the participant portion 340 and employer portion 330 of the claim 320 for each. The statement may also include information from individual bills from individual providers 120 concerning the services rendered by the individual providers 120. For example, the billing information that would otherwise be sent by the providers 120 may be included as attachments in the master bill 800. The statement 800 may also be sent on a non-periodic basis (e.g., a predetermined number of days after a service is provided by a provider, and including any additional itemizations for any additional services provided during the intervening period until the master bill 800 is sent).

Figure 10:
FIG. 10 is an illustration of a payment coupon, according to an exemplary embodiment.

In one embodiment, the statement 800 includes a payment coupon 840, as illustrated in FIG. 10, that the participant may use to remit payment to the lock box account 710. The funds are forwarded to the bank treasury manager 190. The payment coupon 840 may, for example, include the statement number, an account number or participant identification number, the total amount due, the amount owed, payment due date, and/or other information. If the amount required to be paid is less than the entirety of the participant portion 340, the payment coupon may include a minimum payment amount as well as a full payment amount. The coupon may also have a projected pay off date and/or the specific monthly payment relative to the entire series of payments. The participant may then render funds to the financial institution 195. Payment is received and deposited into the lock box account 710. The trustee 180 or treasury management 190 will adequately distribute the funds to the employer deposit account 420 to replenish funds that were previously used to pay the participant portion 340 of the claim and/or into the payment services manager reserve account 610, as described above in connection with FIG. 7.

In the exemplary embodiments illustrated FIGS. 11-13, the participant 110 may be provided with a single, consolidated bill or "master bill" for all health care services received, e.g., during the preceding month. The master bill 800 may include a summary of account activity listing all previous balances, payments and additional chargers and/or new patient responsibilities. Each payment is correlated with a specific service date, a designated reference number and the total amount owed to the health care service provider. The bill 800 may include more detailed information for the health care service received in an appended section. The master bill 800 includes references to the page number(s) where the health care service is discussed in greater detail. In this way, the master bill 800 acts as a table of contents for more descriptive portions of the medical bill. Accordingly, the health care participant may determine the particular health care service in which previous payments were applied. The master bill 800 may contain charges from various individual providers 120 and may provide the participant 110 with the ability to pay for the health care services from the various providers 120 in a single transaction (e.g., a single check paid in connection with the payment coupon 840) as illustrated in FIG. 12. Additionally, by providing the information in a consolidated format, the participant 110 is given the ability to recognize the correlation between different related services provided by different providers 120. For example, the lab services provided by a provider 120 that would otherwise be unrecognized by the participant may be correlated by the participant 110 with a doctor visit in which the participant 110 recalls that lab services were ordered. In another embodiment, the master bill 800 includes a legend having detailed descriptions for medical terms, codes and/or acronyms related to medical services referenced in other portions of the master bill, e.g., the explanation of benefits section.

Figure 9:
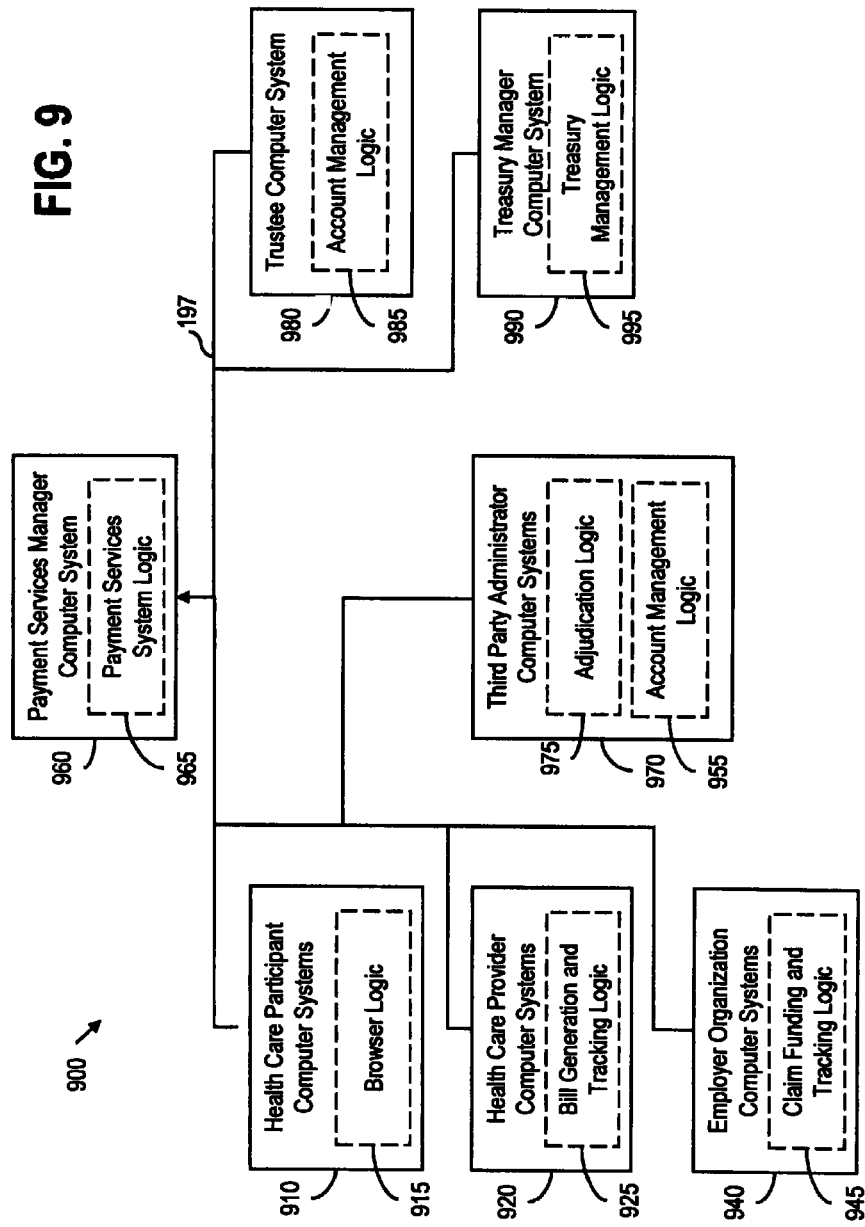
FIG. 9 is a block diagram of a computer system that may be used to implement the payment services system of FIG. 1, according to an exemplary embodiment.

Referring now to FIG. 9, FIG. 9 shows a computer system 900 which implements the payment services system 100. As shown in FIG. 9, the health care providers 120, the employer organizations 140, the network provider organizations 150, the payment services manager 160, the third party administrator 170, the trustee 180, and the treasury manager 190 may each have respective computer systems 915-990 (e.g., including one or more servers and one or more user computers) that are interconnected through a communication network 197, such as the Internet. The computer system 900 permits the entities 110-190 interact with each other electronically.

In another exemplary embodiment, an identification card (e.g., a smart card or other credit card-sized device) which has patient information stored in a computer accessible medium is employed with the payment services system. The card may store information concerning patient care, insurance, health history, and so on. The card may be utilized in conjunction with the health care provider's data management system to streamline the process of transferring information between the participant and provider.

As may be appreciated, the operations described herein as being performed by entities 110-190 may in practice be performed by the computer systems 910-990 associated with each of the respective entities 110-190. That is, each of the computer systems 910-990 may include program logic 915-995 configured to perform the operations described herein as being performed by entities 110-190. Thus, for example, health care provider computer systems 920 may have bill generation and tracking program logic 925 which may, for example, be one or more software applications executing on a computer and used to generate bills and track payment of the bills. Such program logic 925 may electronically communicate claim information to claim adjudication logic 975 executing on the third party administrator computer systems 970, and so on.

In an exemplary embodiment, as previously described, the payment services manager 160 coordinates overall operation of the payment services system 100. As such, operations not specifically identified as being performed by another entity may be performed by the payment services manager computer system 960. As will also be appreciated, such functions may be outsourced to an application service provider that provides a network-accessible platform on behalf of the payment services manager 160 and/or on behalf of another one of the entities 110-190.

The participants 110 may also be provided with access (e.g., through an internet-enabled web browser) to view account information that is stored by the payment services system logic 965. For example, the participants 110 may be provided with the ability to log onto a website, provide user ID/password information, and obtain access to health care service information for services provided by multiple ones of the providers 120, including their master bill 800 for the current and/or preceding periods. Thus, the payment services system logic 965 may provide the participant with a central repository of billing and payment information for health care services that the participant 110 has received. As will be appreciated, communication with the health care participants 110, such as to send out the master bills 800, may also occur through postal mail or in another manner.

Additionally, as indicated above, during operation of payment services system 100, various information may be communicated between the entities 110-190 using the computer systems 910-990. Examples of events involving the communication of such information by the computer system 960 of the payment services manager 160 are as follows (many of which have been previously mentioned): The payment services manager 160 may send a master statement or master bill 800 or statement for collection to the health care participants 110. The payment services manager 160 may provide the trustee 180 with an aging report on any unpaid or delinquent participant accounts. The payment services manager 160 may advise the trustee 180 of the need or desire to set up the claim payment account 430 and disbursement account 440 on the behalf of the employer organization 140. The payment services manager 160 may advise the employer organization 140 of an account or deposit number associated with the employer accounts. The payment services manager 160 may notify the employer of the reserve amount and may send the financial institution 195 wire instructions to transfer the reserve amount into the claim payment account 430. The payment services manager 160 may advise each employer organization 140 of the amount needed for weekly claims (e.g., every Monday or the next business day thereafter in the case of a holiday). The payment services manager 160 may provide a weekly wire transfer file to the bank to pay the third party administrator 170. The payment services manager 160 may notify (e.g., throughout the fiscal calendar) the trustee 180 of running totals on the employer reserve account 910 and the disbursement account 440. The payment services manager 160 may advise the trustee 180, for each transaction, of an employer identification number and whether the appropriate funds are withdrawn from the correlating employer reserve account.

Examples of events involving the communication of such information by the computer system 980 and 990 of the financial institution 195 (including the trustee 180 and the treasury manager 190) are as follows (many of which have been previously mentioned): The financial institution 195 may notify the payment services manager 160 account on a periodic basis the dollars received by the participant. The financial institution 195 may periodically issue to the payment services manager 160 a claims reserve report regarding the status of the claim reserve account 430 (e.g., an electronic report of all debits and credits to the claim payment account 430 daily). The trustee 180 verifies with the payment services manager 160 each day the wires received and the amounts expected. The trustee 180 may deliver to the payment services manager 160 an electronic report of all amounts received in the lock box account. The trustee 180 and the payment services manager 160 may issue an electronic report of all debits and credits to each employer reserve account. The trustee 180 may periodically deliver to the payment services manager 160 an electronic report of all debits and credits to the provider disbursement account 440.

It should be appreciated, of course, that the details associated with the payment services system 100 described herein merely represent one possible implementation. Other applications for this platform include, for example, medical, dental, vision, short-term disability insurance, COBRA/HIPAA administration, flexible spending accounts, and health savings accounts.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention in various embodiments and with various modifications suited to the particular use contemplated.

The invention is described herein with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose, or by a hardwired system.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed machine-readable medium. Combinations of the above are also included within the scope of machine-readable media. Machine-executable instructions comprise, for example, instructions and data which cause a general purpose computer, special purpose computer, or special purpose processing machine to perform a certain operation or group of operations.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets, the Internet and a wide variety of different communication protocols. Those skilled in the art will appreciate that such network computing environments will typically encompass many types of computer system configurations, including personal computers, hand-held devices, multi-processor systems, microprocessor-based or programmable consumer electronics, network personal computers, minicomputers, mainframe computers, and the like. Embodiments of the invention may also be practiced in distributed computing environments where tasks are performed by local and remote processing devices that are linked (either by hardwired links, wireless links or by a combination of hardwired and wireless links) through a communications network. In a distributed computing environment, program modules may be located in both local and remote memory storage devices.

What is claimed is:

1. A computer-implemented health care claim payment method, the method comprising:
   receiving, by a payment services manager computer system comprising a processor and machine readable media having instructions stored therein that are executed by the processor, from a plurality of computer systems of a plurality of health care providers via a communication network, notification of a plurality of claims for a plurality of health care services provided to a patient by the plurality of health care service providers, at least a portion of the claims being payable by a participant in a benefits plan and at least a portion of the claims being payable by a third party payor;
   remitting, by a payment services system logic implemented by the payment services manager computer system, for each claim in the plurality of claims, payment of the entire claim within a predetermined time period of receiving the notification of the claim, including (i) remitting payment of the portion of the claim payable by the third party payor, and (ii) remitting payment of the portion of the claim payable by the participant;
   combining, by the payment services system logic, claim information from the plurality of health care service providers into a master bill, the master bill containing claim information for the plurality of health care service providers;

itemizing, on the master bill, by the payment services system logic, claim information for each of the health care services provided to the patient by the plurality of health care service providers, and wherein the patient did not directly interact with at least some of the health care service providers;

providing the participant the master bill, including the claim information for the plurality of health care service providers; and tracking, by the payment services system logic, payment of the master bill by the participant.

2. The computer-implemented method of claim 1, wherein the predetermined time period within which the remitting payment of the entire claim is performed is 30 days.

3. The computer-implemented method of claim 1, wherein the predetermined time period within which the remitting payment of the entire claim is performed is 20 days.

4. The computer-implemented method of claim 1, wherein the predetermined time period within which the remitting payment of the entire claim is performed is 10 days.

5. The computer-implemented method of claim 1, wherein the remitting step is performed by the payment services manager computer system.

6. The computer-implemented method of claim 1, wherein the sending step is performed by the payment services manager computer system.

7. The computer-implemented method of claim 1, wherein the participant is the patient on whom the health care service is performed.

8. The computer-implemented method of claim 1, wherein the patient on whom the health care service is performed is a family member of the participant.

9. The computer-implemented method of claim 1, wherein remitting further includes
   (iii) accepting risk of delinquency and/or non-payment by the participant.

10. A computer-implemented method, the method comprising:

receiving, by a payment services manager computer system comprising a processor and machine readable media having instructions stored therein that are executed by the processor, from a plurality of computer systems of a plurality of health care providers via a communication network, notification of a plurality of claims for a plurality of health care services provided by the plurality of health care service providers to a patient, at least a portion of the claims being payable by a participant enrolled in a benefits plan;

maintaining, by a payment services system logic implemented by the payment services manager computer system, funds to pay the portion of the claims payable by the participant;

remitting, for each claim in the plurality of claims, payment of the claim, including (i) remitting, on behalf of the participant, payment of the portion of the claim payable by the participant, and (ii) accepting risk of delinquency and/or non-payment by the participant on the funds used to pay the portion of the claims payable by the participant;

combining, by the payment services system logic, claim information from the plurality of health care service providers into a master bill, the master bill containing claim information for the plurality of health care service providers;

itemizing, on the master bill, by the payment services system logic, claim information for each of the health care services provided to the patient by the plurality of health care service providers, and wherein the patient did not directly interact with at least some of the health care service providers;

sending the participant the master bill, including the claim information for the plurality of health care service providers; and tracking, by the payment services system logic, payment of the master bill by the participant.

11. The computer-implemented method of claim 10, wherein the instructions when executed cause the computer system to receive payment from the participant for the participant's portion of the plurality of claims.

12. The computer-implemented method of claim 10, wherein the remitting step is performed by the payment services manager computer system.

13. The computer-implemented method of claim 10, wherein the sending step is performed by the payment services manager computer system.

14. The computer-implemented method of claim 10, wherein the participant is the patient on whom the health care service is performed.

15. The computer-implemented method of claim 10, wherein the patient on whom the health care service is performed is a family member of the participant.

16. A computer-implemented method, the method comprising:

receiving, by a payment services manager computer system comprising a processor and machine readable media having instructions stored therein that are executed by the processor, from a plurality of computer systems of a plurality of health care providers via a communication network, a plurality of claims for a plurality of health care services provided by the plurality of health care service providers to a patient, the receiving being performed by program logic implemented by the instructions stored in the machine-readable storage media, at least a portion of the claims being payable by a participant in a benefits plan and at least a portion of the claims being payable by a third party payor;

remitting payment, by a payment services system logic implemented by the payment services manager computer system, for each claim in the plurality of claims, payment of the entire claim in a single payment, including (i) remitting payment of the portion of the claim payable by the third party payor, and (ii) remitting payment of the portion of the claim payable by the participant;

combining, by the payment services system logic, claim information from the plurality of health care service providers into a master bill, the master bill containing claim information for the plurality of health care service providers;

itemizing, on the master bill, by the payment services system logic, claim information for each of the health care services provided to the patient by the plurality of health care service providers, and wherein the patient did not directly interact with at least some of the health care service providers;

sending the participant the master bill, including the claim information for the plurality of health care service providers; and tracking, by the payment services system logic, payment of the master bill by the participant.

17. The computer-implemented method of claim 16, wherein the sending step is performed by the payment services manager computer system.

18. The computer-implemented method of claim 16, wherein the participant is the patient on whom the health care service is performed.

19. The computer-implemented method of claim 16, wherein the patient on whom the health care service is performed is a family member of the participant.

20. The computer-implemented method of claim 16, wherein remitting further includes
   (iii) accepting risk of delinquency and/or non-payment by the participant.

* * * * *